(12) United States Patent
Nakamura et al.

(10) Patent No.: US 9,975,522 B2
(45) Date of Patent: May 22, 2018

(54) CONSTRUCTION MACHINE

(71) Applicant: Hitachi Construction Machinery Tierra Co., Ltd., Koka-shi, Shiga (JP)

(72) Inventors: Yuta Nakamura, Koka (JP); Tatsuo Takishita, Koka (JP); Masayuki Yunoue, Koka (JP); Takuya Nomura, Ritto (JP); Keisuke Sakisaka, Koka (JP)

(73) Assignee: Hitachi Construction Machinery Tierra Co., Ltd., Koka-shi (JP)

( * ) Notice: Subject to any disclaimer, the term of this patent is extended or adjusted under 35 U.S.C. 154(b) by 0 days. days.

(21) Appl. No.: 15/508,167

(22) PCT Filed: Oct. 29, 2015

(86) PCT No.: PCT/JP2015/080531
§ 371 (c)(1),
(2) Date: Mar. 2, 2017

(87) PCT Pub. No.: WO2016/092969
PCT Pub. Date: Jun. 16, 2016

(65) Prior Publication Data
US 2017/0282857 A1    Oct. 5, 2017

(30) Foreign Application Priority Data

Dec. 12, 2014    (JP) .................... 2014-251891

(51) Int. Cl.
*G06F 21/00* (2013.01)
*B60R 25/24* (2013.01)
(Continued)

(52) U.S. Cl.
CPC ............ *B60R 25/24* (2013.01); *E02F 3/32* (2013.01); *E02F 3/964* (2013.01); *E02F 9/265* (2013.01);
(Continued)

(58) Field of Classification Search
None
See application file for complete search history.

(56) References Cited

U.S. PATENT DOCUMENTS 6,154,694 A * 11/2000 Aoki .................... G07C 5/0858
307/10.2
7,042,333 B2 * 5/2006 Dix ........................ G06Q 10/02
340/5.72
(Continued)

FOREIGN PATENT DOCUMENTS

JP    8-156715 A    6/1996
JP    11-71948 A    3/1999
(Continued)

OTHER PUBLICATIONS

International Search Report (PCT/ISA/220 & PCT/ISA210) issued in PCT Application No. PCT/JP2015/080531 dated Jan. 19, 2016 with English translation (five pages).
(Continued)

*Primary Examiner* — K. Wong
(74) *Attorney, Agent, or Firm* — Crowell & Moring LLP

(57) ABSTRACT

A hydraulic excavator (1) includes a wireless authentication device (42) performing wireless authentication with a portable key device (41) and a vehicle body controller (39) allowing or prohibiting start of the engine (15) on the basis of authentication by the wireless authentication device (42) and an operation of a power switch (12). The wireless authentication device (42) transmits a request signal within an authenticable range and performs authentication when it receives an ID code for authentication replied from the portable key device (41) on the basis of the transmitted request signal. The vehicle body controller (39) allows start of the engine (15) by the power switch (12) when a gate lock lever (13) is switched to a lock position and the wireless authentication device (42) performs authentication by the portable key device (41).

1 Claim, 8 Drawing Sheets

(51) Int. Cl.
*E02F 9/26* (2006.01)
*E02F 3/32* (2006.01)
*E02F 3/96* (2006.01)
*F02D 29/06* (2006.01)
*F02D 29/04* (2006.01)
*H04L 9/32* (2006.01)

(52) U.S. Cl.
CPC ........ *B60R 2325/308* (2013.01); *F02D 29/04* (2013.01); *F02D 29/06* (2013.01); *H04L 9/32* (2013.01)

(56) References Cited

U.S. PATENT DOCUMENTS

| | | | |
|---|---|---|---|
| 7,677,452 B2* | 3/2010 | Faoro | B60R 25/00 |
| | | | 235/385 |
| 9,080,311 B2* | 7/2015 | Yoshida | F02D 41/029 |
| 2014/0191843 A1* | 7/2014 | DeCou | G07C 9/00309 |
| | | | 340/5.61 |
| 2017/0058489 A1* | 3/2017 | Nomura | B60R 25/20 |

FOREIGN PATENT DOCUMENTS

| | | |
|---|---|---|
| JP | 2004-116346 A | 4/2004 |
| JP | 2004-243790 A | 9/2004 |
| JP | 2005-97860 A | 4/2005 |
| JP | 2007-290617 A | 11/2007 |
| JP | 2012-132181 A | 7/2012 |
| JP | 2013-155564 A | 8/2013 |
| JP | 2014-61845 A | 4/2014 |

OTHER PUBLICATIONS

Japanese-language Written Opinion (PCT/ISA/237) issued in PCT Application No. PCT/JP2015/080531 dated Jan. 19, 2016 (three pages).

Japanese-language Office Action issued in counterpart Japanese Application No. 2014-251891 dated Oct. 17, 2017 (Four (4) pages).

* cited by examiner

Fig. 8

| CATEGORY | BASIC TIME | SETTING OF AUTHENTICATION HOLDING TIME BY MANAGER OF VEHICLE (MANUAL SETTING) | |
| --- | --- | --- | --- |
| | | ENGINE START ALLOWABLE TIME BY SITE FOREMAN WHILE HE LEAVES WORK SITE | ENGINE START ALLOWABLE TIME BY RENTAL AGENT (RENTAL ALLOWABLE TIME) |
| TIME | 10 TO 30 SECONDS | 2 TO 3 HOURS | 6 TO 24 HOURS |

Fig.9

| CATEGORY | BASIC RANGE | SETTING OF AUTHENTICABLE RANGE BY MANAGER OF VEHICLE (MANUAL SETTING) | |
| --- | --- | --- | --- |
| | | ENGINE START ALLOWABLE RANGE IN SMALL WORK SITE | ENGINE START ALLOWABLE RANGE IN LARGE WORK SITE |
| RANGE | ABOUT DIAMETER OF 2 m (AROUND OPERATOR'S SEAT) | ABOUT DIAMETER OF 5 m (AROUND OPERATOR'S SEAT) | ABOUT DIAMETER OF 10 m (AROUND OPERATOR'S SEAT) |

CONSTRUCTION MACHINE

TECHNICAL FIELD

The present invention relates to a construction machine such as a hydraulic excavator, a wheel loader, a hydraulic crane and the like, for example, and particularly to a construction machine including a wireless authenticating device for performing wireless authentication with a portable key device.

BACKGROUND ART

In general, the construction machine such as a hydraulic excavator, a hydraulic crane and the like starts/stops an engine on the basis of an operation of a key switch by an operator. More specifically, the operator of the construction machine inserts a plate-shaped or rod-shaped key into a key cylinder of a key switch when the engine is to be started and rotates this key. In this case, when a key groove of the key and a key cylinder groove match each other, the key becomes rotatable.

By the operator, the key is rotated to any one of an "OFF" position where electric equipment of the construction machine is not conducted and the engine is stopped, an "ON" position where the electric equipment is conducted, and a "START" position where the engine is started (a starter motor of the engine is rotated) (Patent Document 1), for example.

Here, engine start of the construction machine is performed in a state where a position of a gate lock lever provided in the vicinity of an operator's seat is set to a lock position (prohibition position) where driving of a hydraulic actuator is prohibited. When the key is rotated from the position of "OFF" to the position of "START" over the position of "ON" in this state, the starter motor of the engine is rotated, and the engine is started. At this time, in the case where an operation of the key is stopped, and the key is brought into a free state, the key returns from the position of "START" to the position of "ON", and an "engine driven/conduction ON" state is brought about where the electric equipment is conducted in a state where the engine is driven.

On the other hand, in the case where the key is rotated from the position of "OFF" to the position of "ON", an "engine stopped/conduction ON" state is brought about where the electric equipment is conducted or connected while the engine is stopped. In the case where the key is further rotated from the position of "ON" to the position of "OFF", the electric equipment is brought into a non-conducted or shut-down state, and in the case where the engine is driven at this time, the engine is stopped.

PRIOR ART DOCUMENT

Patent Document

Patent Document 1: Japanese Patent Laid-Open No. 2013-155564 A

SUMMARY OF THE INVENTION

Incidentally, according to the conventional art, when the engine is to be started, in addition to setting the gate lock lever to the lock position, the key needs to be inserted into the key cylinder and rotated to the position of "START". This key operation might give cumbersomeness to the operator who wants to operate the construction machine as soon as possible, for example.

The present invention was made in view of the aforementioned problem of the conventional art and has an object to provide a construction machine which can simplify a start operation of the engine.

A construction machine of the present invention comprises: a vehicle body; an engine provided on the vehicle body and serving as a power source; a hydraulic pump driven by the engine and supplying a pressurized oil; a hydraulic actuator driven by the pressurized oil supplied from the hydraulic pump; and a lock device switched between a lock position prohibiting driving of the hydraulic actuator and an unlock position allowing the driving of the hydraulic actuator, wherein a work is performed by the driving of the hydraulic actuator in a state where the lock device is switched to the unlock position.

In order to solve the aforementioned problem, a characteristic of a configuration adopted by the present invention includes a power switch for starting the engine; a wireless authentication device provided on the vehicle body and performing wireless authentication with a portable key device; a vehicle body controller allowing or prohibiting start of the engine on the basis of an operation of the power switch and authentication by the wireless authentication device, wherein the wireless authentication device is constituted to transmit an authentication request signal within an authenticable range and to perform authentication when an authentication signal replied from the portable key device is received on the basis of the transmitted authentication request signal; and the vehicle body controller is constituted to allow start of the engine by the power switch when the lock device is switched to the lock position and wireless authentication device performs authentication by portable key device.

According to the construction machine of the present invention, a start operation of the engine can be simplified.

BRIEF DESCRIPTION OF THE DRAWINGS

FIG. 8 is an explanatory view showing an example of setting of the authentication holding time as a list.

FIG. 9 is an explanatory view showing an example of setting of the authenticable range as a list.

MODE FOR CARRYING OUT THE INVENTION

Hereinafter, an embodiment of a construction machine according to the present invention will be described in detail explained with reference to the accompanying drawings by taking a case applied to a small-sized hydraulic excavator called a mini excavator as an example.

Figure 1:
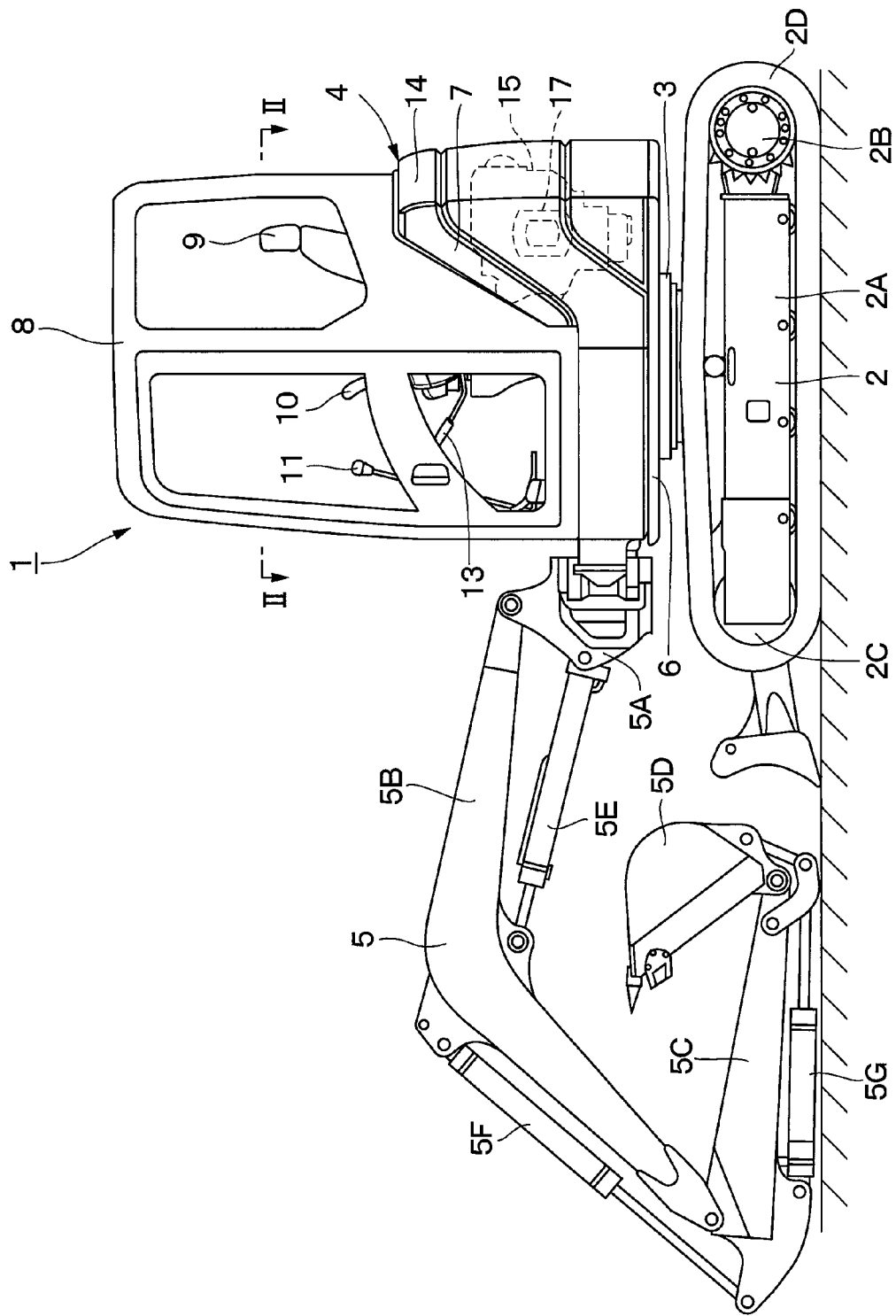
FIG. 1 is a front view showing a hydraulic excavator according to an embodiment.
Figure 2:
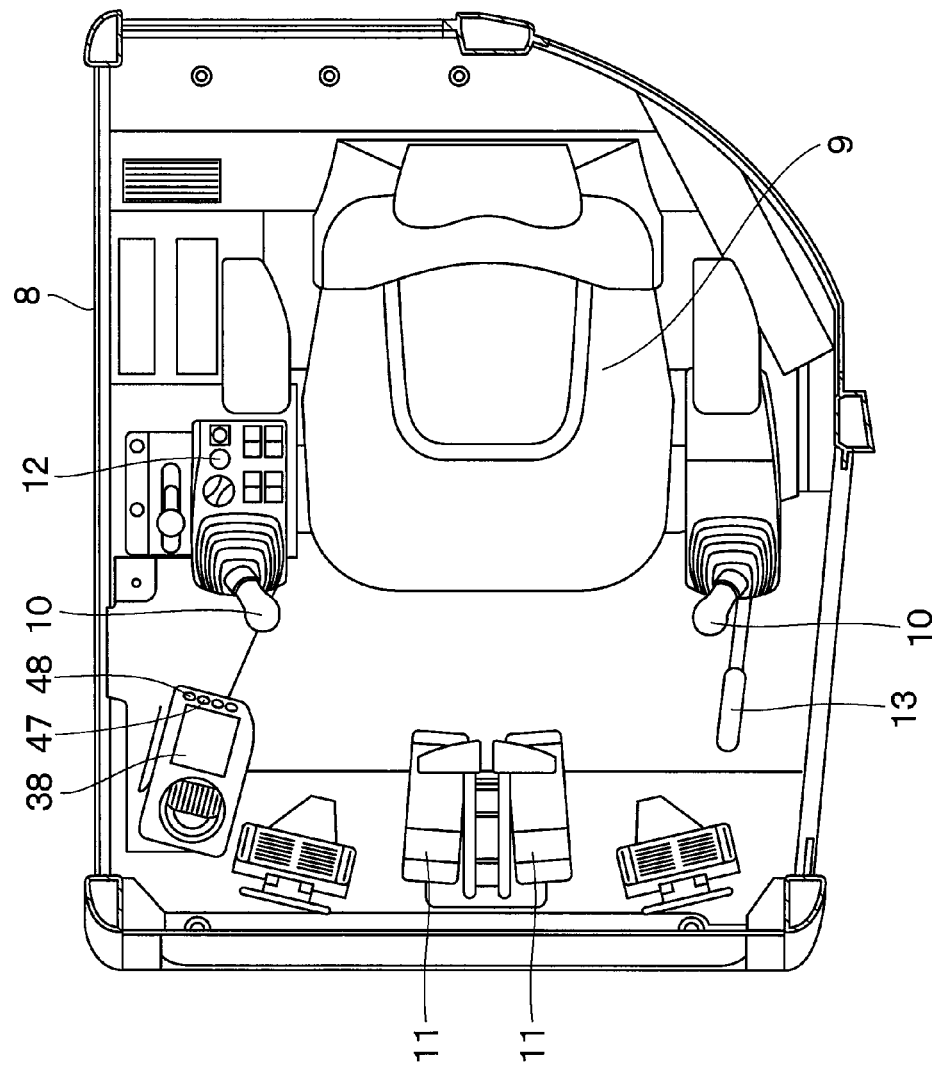
FIG. 2 is a sectional view of an inside of a cab when seen from an arrow II-II direction in FIG. 1.

In FIG. 1, a hydraulic excavator 1 as a construction machine is a small-sized hydraulic excavator called a mini excavator suitable for a work in a small work site. The hydraulic excavator 1 is constituted by including a automotive crawler-type lower traveling structure 2, an upper revolving structure 4 mounted on the lower traveling structure 2 capable of revolving through a revolving device 3, and a working mechanism 5 provided on a front side of the upper revolving structure 4, capable of tilting and lifting thereto. The hydraulic excavator 1 performs an excavating work of earth and sand by using the working mechanism 5. Here, the lower traveling structure 2 and the upper revolving structure 4 constitute a vehicle body of the hydraulic excavator 1. Since the small-sized hydraulic excavator 1 is used in a demolishing work of an inside of a building, the excavating work in a small place such as in a street and the like, a machine weight is kept to approximately 0.8 to 8 tons, for example.

The lower traveling structure 2 is constituted by a truck frame 2A, drive wheels 2B provided on both left and right sides of the truck frame 2A, idler wheels 2C provided on the both left and right sides of the truck frame 2A and on sides opposite to the drive wheels 2B in a front-rear direction, and a crawler belt 2D wound around the drive wheel 2B and the idler wheel 2C (only left side is shown for the both). The left and right drive wheels 2B are rotated/driven by left and right traveling hydraulic motors (not shown) as hydraulic actuators, respectively.

The working mechanism 5 is constituted as a swing-post type working mechanism, for example. The working mechanism 5 includes a swing post 5A, a boom 5B, an arm 5C, and a bucket 5D as a work tool. In addition to them, the working mechanism 5 includes a swing cylinder (not shown) for causing the swing post 5A (and thus, the entire working mechanism 5) to swing left and right, a boom cylinder 5E for rotating the boom 5B, an arm cylinder 5F for rotating the arm 5C, and a bucket cylinder 5G as a work tool cylinder for rotating the bucket 5D. The swing cylinder, the boom cylinder 5E, the arm cylinder 5F, and the bucket cylinder 5G constitute hydraulic actuators driven by pressurized oil, respectively.

On the other hand, the upper revolving structure 4 is mounted on the lower traveling structure 2 through the revolving device 3 constituted by including a revolving hydraulic motor as the hydraulic actuator, a speed reduction mechanism, and a revolving bearing. The upper revolving structure 4 is revolved/driven by the revolving device 3 with respect to the lower traveling structure 2. Here, the upper revolving structure 4 is constituted by including a revolving frame 6, an exterior cover 7, a cab 8, and a counterweight 14 which will be described later.

The revolving frame 6 is a frame forming a support structural body of the upper revolving structure 4, and the revolving frame 6 is mounted on the lower traveling structure 2 through the revolving device 3. On the revolving frame 6, the counterweight 14 and an engine 15 which will be described later are provided on a rear part side thereof, the cab 8 which will be described later is provided on a front left side, and a fuel tank and a hydraulic oil tank (none of them are shown) are provided on a front right side. The exterior cover 7 is provided on the revolving frame from the right side of the cab 8 to the rear side and left and right side surface sides. The exterior cover 7 defines a machine room accommodating the engine 15, a hydraulic pump 17, a heat exchanger (not shown) and the like together with the revolving frame 6, the cab 8, and the counterweight 14.

The cab 8 is mounted on the front left side of the revolving frame 6, and an inside of the cab 8 forms an operator's room which an operator (driver) gets onboard. An operator's seat 9 on which the operator is seated is provided in the inside of the cab 8. An operating lever 10 for work for operating the working mechanism 5 is provided on the both left and right sides of the operator's seat 9. An operating lever/pedal 11 for traveling operated by a manual operation or a stepping-on operation when the lower traveling structure 2 is made to run is provided on a front of the operator's seat 9.

Figure 3:
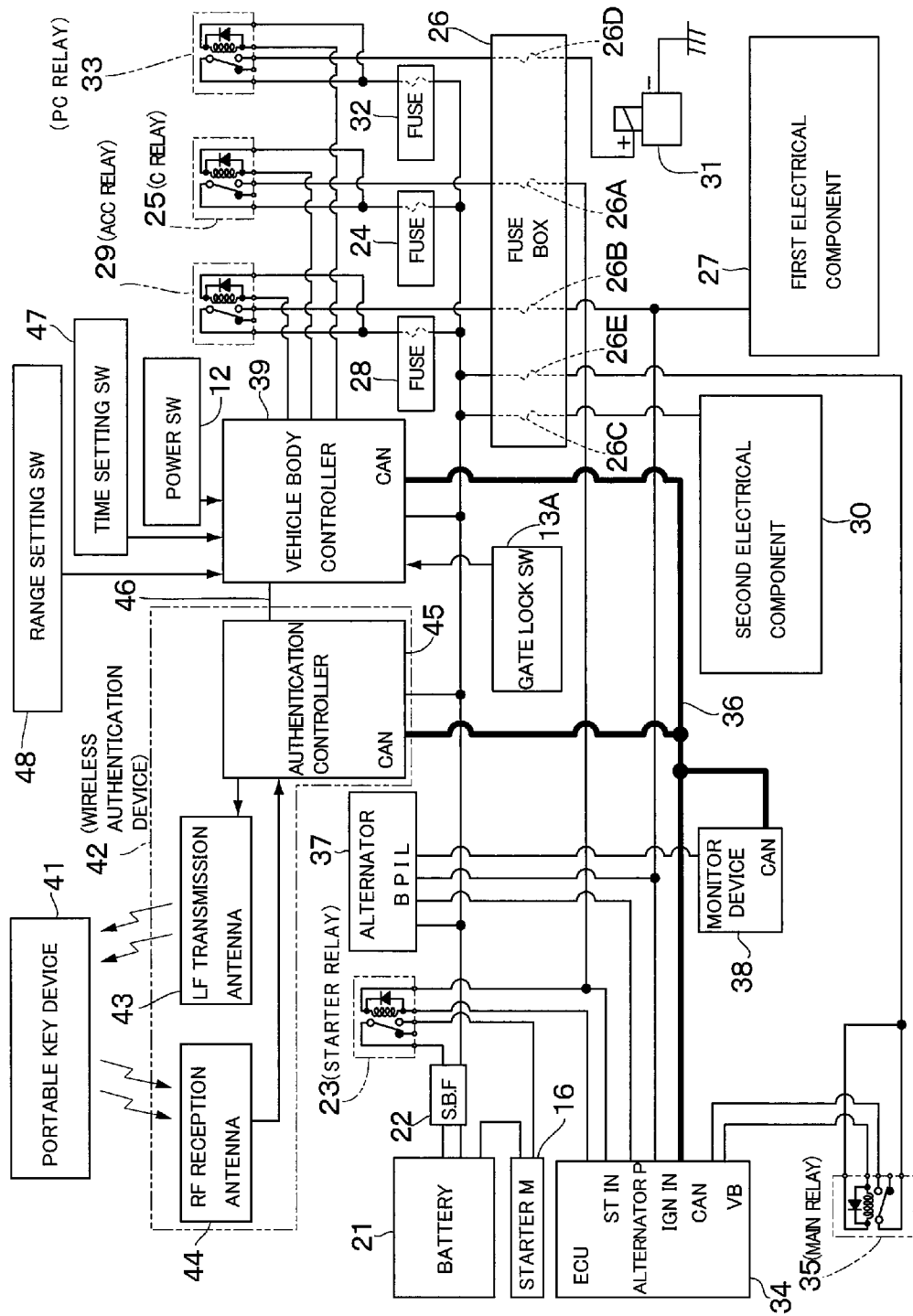
FIG. 3 is an electric circuit constitution diagram of a hydraulic excavator.

In the vicinity of the operator's seat 9 or more specifically, a power switch 12 is provided on a rear side of the right operating lever 10 on the right side of the operator's seat 9. The power switch 12 is a main switch for starting the engine 15. This power switch 12 is constituted by a push-type switch, for example, and operated (pressed) by the operator. As shown in FIG. 3, the power switch 12 is connected to a vehicle body controller 39 which will be described later. When the power switch 12 is operated by the operator, it outputs a signal (ON signal) indicating conduction to the vehicle body controller 39. The operator can start, stop or the like of the engine 15 which will be described later by seating on the operator's seat 9 and operating the power switch 12.

On the other hand, on the left side of the operator's seat 9 or more specifically, a gate lock lever 13 is provided on a lower side of the left-side work operating lever 10 and at a position corresponding to an entrance way of the cab 8. The gate lock lever 13 constitutes a lock device together with a gate lock switch 13A which will be described later. The gate lock lever 13 is rotated/displaced between a boarding restricted position (hereinafter referred to as an unlock position) shutting off the entrance way of the cab 8 and a boarding allowed position (hereinafter referred to as a lock position) opening the entrance way. Here, the unlock position which shuts off the entranceway corresponds to a state where the gate lock lever 13 is lowered, while the lock position opening the entrance way corresponds to a state where the gate lock lever 13 is opened. The gate lock lever 13 in the lowered state (unlock position) is shown in FIG. 1.

The gate lock lever 13 is switched by an operation by the operator between the lock position (raised position) and the unlock position (lowered position). In this case, when the gate lock lever 13 is set to the lock position, the hydraulic actuator of the hydraulic excavator 1, that is, driving of various hydraulic actuators such as each of the cylinders 5E, 5F, and 5G, the traveling hydraulic motor, the revolving hydraulic motor and the like is prohibited. On the other hand, when the gate lock lever 13 is set to the unlock position, driving of the hydraulic actuators is allowed.

Here, the gate lock switch 13A (see FIG. 3) is provided on the gate lock lever 13. The gate lock switch 13A is a detection switch for detecting a position of the gate lock lever 13. As shown in FIG. 3, the gate lock switch 13A is connected to the vehicle body controller 39 which will be described later. The vehicle body controller 39 can determine whether the gate lock lever 13 is at a lock position or at an unlock position on the basis of a detection signal (ON/OFF signal) of the gate lock switch 13A. In this case, the gate lock switch 13A can be constituted as a normally-open switch which is in a non-conducted (OFF) state when the gate lock lever 13 is at the lock position and in a conducted (ON) state when at the unlock position, for example.

Moreover, as shown in FIG. 3, the vehicle body controller 39 is connected to a pilot cut relay 33 which will be described later. In this case, a battery 21 and a pilot pressure switching valve 31 which will be described later are connected through the pilot cut relay 33.

When the gate lock lever 13 is set to the lock position, a pilot pressure (switching signal) for switching a control valve (control valve device), not shown, is shut off, and the control valve is maintained at a neutral position, for example. More specifically, when the vehicle body controller 39 determines that the gate lock lever 13 is at the lock position from the gate lock switch 13A, it turns OFF (opens) the pilot cut relay 33 and brings the pilot pressure switching valve 31 to a shut-off state (OFF). As a result, the pressurized oil delivered from the hydraulic pump 17 is not supplied to the hydraulic actuator but returns to the hydraulic oil tank, and the driving of the hydraulic actuator is prohibited.

On the other hand, when the gate lock lever 13 is set to the unlock position, the pilot pressure can be supplied to the control valve through the operating lever 10 for work and the operating lever/pedal 11 for traveling. More specifically, when the vehicle body controller 39 determines that the gate lock lever 13 is at the unlock position from the gate lock switch 13A, it turns ON (closes) the pilot cut relay 33 and brings the pilot pressure switching valve 31 to a conducted state (ON) on the basis of the supply (power feed) of electricity from the battery 21. In this case, the control valve is switched, and driving of the hydraulic actuator is allowed on the basis of the operation of the operating lever 10 and the operating lever/pedal 11 for traveling by the operator. As described above, the hydraulic excavator 1 performs a work by driving of the hydraulic actuator in the state where the gate lock lever 13 is switched to the unlock position.

The counterweight 14 is to take a weight balance with the working mechanism 5. The counterweight 14 is located on a rear side of the engine 15 which will be described later and mounted on a rear end portion of the revolving frame 6. A rear surface side of the counterweight 14 is formed having an arc shape. The counterweight 14 has constitution accommodated in a vehicle width of the lower traveling structure 2. Therefore, the hydraulic excavator 1 constitutes a rear-small-revolving type mini excavator.

The engine 15 is provided on the upper revolving structure 4. Specifically, the engine 15 is disposed in a lateral state on a rear side of the revolving frame 6 constituting the upper revolving structure 4. The engine 15 is constituted by using a small-sized diesel engine, for example, and becomes a power source for the hydraulic pump 17 which will be described later. Here, the engine 15 is constituted by an electronically controlled type engine and its fuel supply amount is variably controlled by a fuel injection device including an electronically controlled injection valve (injector), for example. That is, the fuel injection device variably controls a fuel injection amount injected into a cylinder of the engine 15 on the basis of a control signal output from an engine control unit 34 (see FIG. 3) called ECU which will be described later.

As shown in FIG. 3, a starter motor 16 is provided in the engine 15. The starter motor 16 is an electrical component (auxiliary machine) of the engine 15, that is, electric equipment device of the engine 15. The starter motor 16 is connected to the battery 21 through a starter relay 23 or the like which will be described later. The starter motor 16 is to rotate a crank shaft of the engine 15 when the engine 15 is to be started. That is, when the starter relay 23 is turned ON (closed), the starter motor 16 is rotated on the basis of power feed from the battery 21, and the engine 15 can be started. When the engine 15 is started, the starter relay 23 is turned OFF (opened), and the starter motor 16 is stopped.

The hydraulic pump 17 is mounted on a left side of the engine 15. The hydraulic pump 17 constitutes a hydraulic source together with the hydraulic oil tank. That is, the hydraulic pump 17 suctions the hydraulic oil from the hydraulic oil tank by being driven by the engine 15 and supplies the suctioned hydraulic oil as the pressurized oil toward the control valve, not shown. The hydraulic pump 17 is constituted by a variable displacement type swash-plate type, an inclined shaft type or a radial piston type hydraulic pump, for example. It should be noted that the hydraulic pump 17 does not necessarily have to be the variable displacement type hydraulic pump but may be constituted by using a fixed displacement type hydraulic pump, for example.

On the other hand, the control valve (not shown) is switched in accordance with the pilot pressure supplied on the basis of the operation of the operating lever 10 for work and the operating lever/pedal 11 for traveling. As a result, the control valve selectively supplies or delivers the pressurized oil delivered from the hydraulic pump 17 to or from various hydraulic actuators including each of the cylinders 5E, 5F, and 5G, the traveling hydraulic motor, and the revolving hydraulic motor.

Next, constitution of an electric circuit of the hydraulic excavator 1 will be described by referring to FIG. 3.

In FIG. 3, the battery 21 is a power source for various electric equipment including the engine 15. More specifically, the battery 21 is a power source for the electric equipment for driving the engine 15 such as the starter motor 16 provided in the engine 15, the fuel injection device (injector), various sensors, and moreover, the engine control unit 34 (hereinafter referred to as an ECU 34) and the like, for example. In addition, the battery 21 is a power source for various electric equipment mounted on the hydraulic excavator 1 such as a first electrical component 27, a second electrical component 30, a monitor device 38, the vehicle body controller 39, an authentication controller 45 and the like, for example.

Here, the starter motor 16 is connected to the battery 21 through a slow-blow fuse 22 (hereinafter referred to as an SB fuse 22) called S.B.F. and the starter relay 23 and constitutes a starter circuit. The starter relay 23 is connected to the battery 21 through the SB fuse 22, a C fuse 24, a C relay 25, and a C fuse 26A in a fuse box 26 and constitutes a C-relay circuit.

The C relay 25 is switched between ON and OFF by the vehicle body controller 39 which will be described later. In this case, when the C relay 25 is turned ON, an electric current flows through the ECU 34 and the starter relay 23. As a result, the ECU 34 turns ON the starter relay 23 and brings the starter motor 16 and the battery 21 in the conducted state. As a result, the starter motor 16 is rotated, and the engine 15 can be started. When the engine 15 is started, the starter relay 23 is turned OFF.

The first electrical component 27 is connected to the battery 21 through the SB fuse 22, an accessory fuse 28 (hereinafter referred to as an ACC fuse 28), an accessory relay 29 (hereinafter referred to as an ACC relay 29), an ACC fuse 26B in the fuse box 26 and constitutes an accessory circuit (ACC circuit). The first electrical component 27 corresponds to electric equipment conducted to the battery 21 when the ACC relay 29 connected to the vehicle body controller 39 is ON.

The first electrical component 27 is not conducted to the battery 21 when the ACC relay 29 connected to the vehicle body controller 39 is OFF. Here, the first electrical component 27 is also called an accessory electrical component (ACC electrical component). This first electrical component 27 includes a part of the monitor device 38, a part of the controller (controllers other than the vehicle body controller 39 and the authentication controller 45, for example), an air conditioning device, a wiper, various solenoid valves and the like, for example. The first electrical component 27 also includes electric equipment required for driving of the engine 15 such as a fuel injection device of the engine 15 and the like, for example.

On the other hand, the second electrical component 30 is connected to the battery 21 through the SB fuse 22 and a B fuse 26C in the fuse box 26. The second electrical component 30 corresponds to electric equipment connected to the battery 21 at all times regardless of ON/OFF of the C relay 25, the ACC relay 29, and the pilot cut relay 33 which will be described later connected to the vehicle body controller 39. Here, the second electrical component 30 is also called a battery directly-connected electrical component or a B electrical component. This second electrical component 30 includes apart of the monitor device 38, the vehicle body controller 39, the authentication controller 45, a horn, a light and the like, for example.

The pilot pressure switching valve 31 is also called a pilot cut solenoid valve. The pilot pressure switching valve 31 is provided between a pilot pump, not shown, and the control valve, for example. The pilot pressure switching valve 31 switches between allowing and prohibition of supply of the pilot pressure to the control valve, that is, between conduction and shut-off of the pilot pressurized oil. The pilot pressure switching valve 31 is connected to the battery 21 through the SB fuse 22, the pilot cut fuse 32, the pilot cut relay 33, and a PC fuse 26D in the fuse box 26. Here, the pilot cut relay 33 is connected to the vehicle body controller 39. The vehicle body controller 39 switches ON/OFF of the pilot cut relay 33 in accordance with a signal of the gate lock switch 13A corresponding to the position of the gate lock lever 13.

When the pilot cut relay 33 is ON, the pilot pressure switching valve 31 and the battery 21 are conducted, and the pilot pressure switching valve 31 is brought into the conducted state. As a result, the pilot pressure can be supplied to the control valve through the operating lever 10 for work and the operating lever/pedal 11 for traveling, and driving of the hydraulic actuator (the swing cylinder, the boom cylinder 5E, the arm cylinder 5F, the bucket cylinder 5G, the revolving hydraulic motor, the traveling hydraulic motor) is allowed. On the other hand, when the pilot cut relay 33 is OFF, the pilot pressure switching valve 31 and the battery 21 are not conducted, and the pilot pressure switching valve 31 is brought into the shut-off state. In this case, the pilot pressure cannot be supplied to the control valve, and driving of the hydraulic actuator is prohibited.

The ECU 34 is a control device performing rotation number control and the like of the engine 15 and this ECU 34 is constituted by a microcomputer or the like, for example. The ECU 34 is connected to the various sensors and the fuel injection device provided in the engine 15. The ECU 34 operates the engine 15 at a rotation number according to the driving operation by the operator, an operating state of the vehicle and the like by variably controlling the fuel injection amount (fuel supply amount) into the cylinder of the engine 15, for example. In this case, the ECU 34 controls the fuel injection amount of the fuel injection device on the basis of an instruction of an engine rotation number instruction dial operated by the operator and an instruction from the vehicle body controller 39.

Here, the ECU 34 is connected to the battery 21 through the SB fuse 22, an ECU fuse 26E in the fuse box 26, and a main relay 35. Moreover, the ECU 34 is connected to the starter relay 23, an alternator 37, and the ACC relay 29. The main relay 35 is switched ON/OFF by the ECU 34. That is, when the ACC relay 29 is turned ON, an electric current flows from the ACC relay 29 to the ECU 34, and the ECU 34 turns ON the main relay 35. As a result, the ECU 34 is brought into the conducted state with the battery 21. Moreover, the ECU 34 is mutually connected to the monitor device 38, the vehicle body controller 39, the authentication controller 45 and the like through a communication line 36 and constitutes a CAN (Control Area Network).

The alternator 37 generates power by being driven by the engine 15. The alternator 37 feeds power to the first electrical component 27, the second electrical component 30, the ECU 34, the monitor device 38, the vehicle body controller 39, the authentication controller 45 and the like in addition to storage of electricity (charging) of the battery 21. Here, the alternator 37 has its B terminal connected to the battery 21 through the SB fuse 22, a P terminal and an I terminal connected to the ECU 34, and an L terminal connected to the monitor device 38.

The monitor device 38 is provided in the cab 8 of the hydraulic excavator 1, for example, and notifies an operation state of the hydraulic excavator 1 and the like to the operator manipulating the hydraulic excavator 1. More specifically, the monitor device 38 displays information to be notified to the operator. That is, the monitor device 38 displays information such as various state amounts including an engine rotation number, a remaining fuel amount, a remaining oil amount and the like, nonconformity information, alarm information and the like of the engine 15 and various devices including hydraulic devices, for example. Moreover, as will be described later, authentication holding time, the authenticable range of the wireless authentication device 42, and a setting screen for setting them and the like are displayed on the monitor device 38. The monitor device 38 is constituted by including a display screen, a display light, an alarm lamp, a selection switch, and a horn to be used as an acoustic device, for example. The monitor device 38 is to be used as a notifying device for notifying information to the operator.

The vehicle body controller 39 is a control device or a control unit integrally managing the monitor device 38, the ECU 34, and the authentication controller 45. The vehicle body controller 39 is constituted by including a microcomputer and the like, for example. Here, the vehicle body controller 39 switches conduction (ON) and non-conduction (OFF) between the battery 21 and the electric equipment on the basis of the wireless authentication with the portable key device 41 performed by the wireless authentication device 42 which will be described later and the operation of the power switch 12 by the operator.

That is, the vehicle body controller 39 switches conduction and non-conduction between the battery 21 and the first electrical component 27 and conduction and non-conduction between the battery 21 and the starter motor 16 on the basis of the authentication of the wireless authentication device 42 and the operation of the power switch 12. In other words, the vehicle body controller 39 allows or prohibits start of the engine 15 on the basis of the result of the authentication (whether it is an authenticated state or an unauthenticated state) by the wireless authentication device 42 and presence or absence of the operation of the power switch 12.

Next, the portable key device 41 and the wireless authentication device 42 which perform wireless authentication will be described.

The portable key device 41 is also called an electronic key or a portable machine. This portable key device 41 is held by a manager such as the operator operating the hydraulic excavator 1, a site foreman of a work site, an owner of the hydraulic excavator 1 and the like. When the portable key device 41 receives a request signal (authentication request signal) transmitted from the authentication controller 45 of the wireless authentication device 42 through an LF transmission antenna 43, it transmits an ID code (authentication signal, authentication number) for authentication to the authentication controller 45.

For that purpose, the portable key device 41 includes a receiver for receiving the request signal, a transmitter for transmitting the ID code to an RF reception antenna 44 of the authentication controller 45, a microcomputer for controlling them, a battery for supplying electricity to them, a transponder for which the ID code is set and the like (none of them are shown). It should be noted that the transponder collates (authenticates) the ID code by being brought close to an antenna (not shown) for the transponder provided on the vehicle body when the battery of the portable key device 41 is exhausted.

Figure 4:
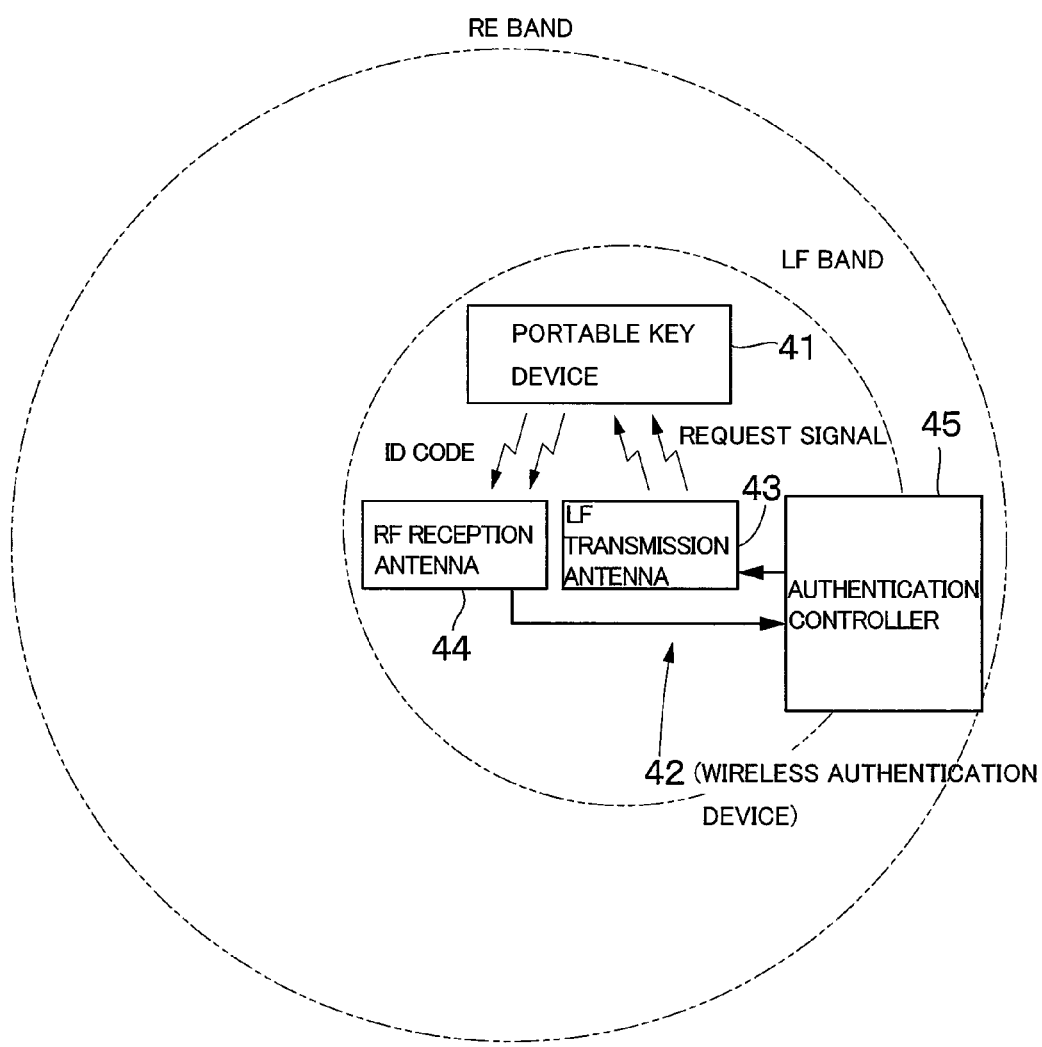
FIG. 4 is an explanatory view showing a relationship between transmission and reception between a portable key device held by an operator and a transmission antenna and a reception antenna on the hydraulic excavator side.

As shown in FIG. 4, when the portable key device 41 comes within a transmission range (LF band) of the LF transmission antenna 43 connected to the authentication controller 45, it receives the request signal (authentication request signal) transmitted from the LF transmission antenna 43 by the receiver. The portable key device 41 transmits the ID code for authentication set to the portable key device 41 through the transmitter on the basis of this reception.

On the other hand, the wireless authentication device 42 is provided in the upper revolving structure 4 (in the cab 8, for example) which is a vehicle body side. The wireless authentication device 42 performs wireless authentication with the portable key device 41. In this case, the wireless authentication device 42 transmits the request signal in the authenticable range and performs authentication when the ID code for authentication replied from the portable key device 41 on the basis of the transmitted request signal is received. Here, the wireless authentication device 42 is constituted by including one or a plurality of the LF transmission antennas 43 as a transmission antenna, one or a plurality of the RF reception antennas 44 as a reception antenna, and the authentication controller 45.

The LF transmission antenna 43 is connected to the authentication controller 45 and transmits the request signal (authentication request signal) indicating that the ID code for authentication is transmitted to the portable key device 41 at all times at a predetermined control cycle (0.5 second-cycle, for example). The RF reception antenna 44 is connected to the authentication controller 45 and receives the ID code transmitted from the portable key device 41.

As shown in FIG. 4, a transmission range (LF band) of the LF transmission antenna 43 is smaller than a reception range (RF band) of the RF reception antenna 44. The transmission range (LF band) of the LF transmission antenna 43 has a diameter of approximately 1 meter around the operator's seat 9, for example. On the other hand, the reception range (RF band) of the RF reception antenna 44 has a diameter of approximately 10 meters around the operator's seat 9, for example. As will be described later, the transmission range (authenticable range) of the LF transmission antenna 43 can be variably set by a range setting switch 48 within a range having a diameter of approximately 1 to 10 meters around the operator's seat 9, for example.

The authentication controller 45 is constituted by a microcomputer and this authentication controller 45 is connected to the vehicle body controller 39 through the communication line 36 and an analog signal line 46 which is a communication line different from the communication line 36. The authentication controller 45 is a control device for wireless authentication which performs wireless authentication of the portable key device 41. That is, the authentication controller 45 transmits the request signal to the authenticable range through the LF transmission antenna 43 at the predetermined control cycle (0.5-second cycle, for example). In addition, the authentication controller 45 authenticates (determines) whether the ID code from the portable key device 41 received through the RF reception antenna 44 is a valid ID code or not, that is, whether it matches the ID code allowed for start of the engine 15 set in advance in the authentication controller 45 or not. The authentication controller 45 outputs an authentication result (determination result) to the vehicle body controller 39 at all times at a predetermined control cycle (0.5-second cycle, for example).

For example, when the authentication controller 45 receives a valid ID code from the portable key device 41 through the RF reception antenna 44, it determines to be valid authentication. That is, in this case, the authentication controller 45 outputs a fact (valid authentication: the fact that the portable key device 41 is within the authenticable range) that the portable key device 41 transmitting the valid ID code is present in the transmission range (LF band in FIG. 4) of the LF transmission antenna 43 to the vehicle body controller 39. On the other hand, when the authentication controller 45 has not received the valid ID code (including reception of an invalid ID code), it determines to be unauthenticated. That is, in this case, the authentication controller 45 outputs a fact that there is no portable key device 41 transmitting the valid ID code within the transmission range of the LF transmission antenna 43 (unauthentication: the fact that the portable key device 41 is not within the authenticable range) to the vehicle body controller 39.

Here, in this embodiment, the authentication controller 45 is constituted to hold the authenticated state for predetermined authentication holding time after it received the valid ID code replied from the portable key device 41. That is, when the authentication controller 45 receives the valid ID code from the portable key device 41, it holds the state of valid authentication for the predetermined holding time after that even if a valid ID code is not received. In other words, the authentication controller 45 continuously outputs the valid authentication to the vehicle body controller 39. In this case, the authentication holding time can be variably set by the manager of the hydraulic excavator 1. For that purpose, a time setting switch 47 as a time setting unit which can variably set the authentication holding time of the wireless authentication device 42 is connected to the vehicle body controller 39. The setting of the authentication holding time can be made the time setting switch 47 while an authentication holding time setting screen is displayed on the monitor device 38 by increasing/decreasing the authentication holding time (seconds, minutes, hours, days, for example) displayed on this screen, for example.

For example, as shown in FIG. 8, in the case where the setting is not made by the manager, the authentication holding time is set to 10 to 30 seconds (short time) which is basic time. In this case, the basic time is set as time assumed to be restored normally even if transmission/reception of the ID code between the portable key device 41 and the wireless authentication device 42 cannot be performed temporarily on the basis of electromagnetic interference caused by disturbance, for example. That is, the basic time is set in advance as waiting time until a communication environment is normally restored.

On the other hand, the site foreman of the work site of the hydraulic excavator 1 can set the authentication holding time to long time such as 2 to 3 hours, for example. In this case, even if the site foreman leaves the hydraulic excavator 1 for a meeting or the like while holding the portable key device 41, the operator can start the engine 15 of the hydraulic excavator 1 at the work site during this period. Moreover, a rental agent or a lease agent of the hydraulic excavator 1 can also set the authentication holding time, that is, time during which start of the engine 15 of the hydraulic excavator 1 can be performed as a rental period or a lease period.

Moreover, in the embodiment, the authentication controller 45 transmits the request signal within the predetermined authenticable range through the LF transmission antenna 43. In this case, this authenticable range (transmission range of the LF transmission antenna 43) can be variably set by the manager of the hydraulic excavator 1. For that purpose, the range setting switch 48 as a range setting unit which can variably set the authenticable range of the wireless authentication device 42 is connected to the vehicle body controller 39. The setting of the authenticable range can be made by the range setting switch 48 while the authenticable range setting screen is displayed on the monitor device 38. That is, the setting can be made by enlarging/reducing the authenticable range displayed on the screen of the monitor device 38 by using the range setting switch 48. For example, the setting can be made by enlarging or reducing a diameter around the operator's seat 9. In this case, enlargement or reduction of the authenticable range can be made by changing intensity of electric waves of the LF transmission antenna 43, for example.

For example, in the case where the setting is not made by the manager as shown in FIG. 9, the authenticable range is a basic range or a range having a diameter of approximately 2 meters around the operator's seat 9, for example. In this case, the engine 15 cannot be started until a person holding the portable key device 41 gets on the cab 8. On the other hand, depending on a use environment, a work environment and the like of the hydraulic excavator 1, the authenticable range can be a range having a diameter of approximately 5 meters or a range having a diameter of approximately 10 meters around the operator's seat 9. In this case, by leaving the portable key device 41 at a predetermined place such as in an office away from the hydraulic excavator 1, a plurality of persons not holding the portable key device 41 can freely start the engine 15.

The vehicle body controller 39 turns ON/OFF of the ACC relay 29 and ON/OFF of the C relay 25 on the basis of the authentication result of the authentication controller 45 and presence or absence of the operation of the power switch 12. For that purpose, the vehicle body controller 39 is constituted by including a microcomputer and the like, for example, and is connected to the authentication controller 45, the power switch 12, the gate lock switch 13A, the ACC relay 29, the C relay 25 and the like. Moreover, the time setting switch 47 and the range setting switch 48 are connected to the vehicle body controller 39. The vehicle body controller 39 has a storage section (not shown) constituted by a ROM, a RAM and the like, and this storage section stores a processing program for starting the engine 15 shown in FIG. 5 which will be described later, a setting processing program of the authentication holding time shown in FIG. 6, a setting processing program of the authenticable range shown in FIG. 7 and the like.

The vehicle body controller 39 switches ON/OFF of the ACC relay 29 and ON/OFF of the C relay 25 on the basis of the authentication result (valid authentication or unauthentication) of the authentication controller 45, whether the power switch has been operated or not, the position of the gate lock lever 13 by the gate lock switch 13A (whether it is the lock position or the unlock position) and the like.

Here, when the vehicle body controller 39 turns OFF the ACC relay 29 and turns OFF the C relay 25, a state where the engine 15 has been stopped, and the first electrical component 27 and the starter motor 16 are non-conducted (OFF), that is, the state of "engine stop/conduction OFF" can be realized.

When the vehicle body controller 39 turns ON the ACC relay 29 and turns ON the C relay 25 from the state of the "engine stop/conduction OFF" and turns OFF the C relay 25 after driving of the engine 15, a state where the engine 15 has been driven, and the first electrical component 27 is conducted (ON), that is, the state of "engine driven/conduction ON" can be realized.

On the other hand, when the vehicle body controller 39 turns ON only the ACC relay 29 from the state of the "engine stop/conduction OFF", a state where the engine 15 has been stopped, and the first electrical component 27 is conducted (ON), that is, a state of "engine stopped/conduction ON" can be realized.

Here, in the case of the "engine stop/conduction OFF", the portable key device 41 is within the authenticable range (LF band) and the gate lock lever 13 is at the lock position (raised position), and when the power switch 12 is operated, the vehicle body controller 39 switches the "engine stop/conduction OFF" to the "engine driven/conduction ON". That is, when the gate lock lever 13 is switched to the lock position, and the wireless authentication device 42 performs authentication by the portable key device 41, the vehicle body controller 39 determines that the authentication result is the valid authentication and allows start of the engine 15 by the power switch 12. When the power switch 12 is operated in this state, the vehicle body controller 39 turns ON the C relay 25, transmits an engine start signal to the ECU 34 and starts the engine 15. As described above, when the gate lock lever 13 is at the lock position and the portable key device 41 is within the authenticable range, the operator can start the engine 15 only by operating the power switch 12.

Moreover, within the authentication holding time during which the valid authentication state is held, the vehicle body controller 39 allows start of the engine 15 by the power switch 12 on a condition that the gate lock lever 13 is at the lock position even if the portable key device 41 is not in the authenticable range. Processing in FIGS. 5 to 7 executed by the vehicle body controller 39, that is, processing of starting the engine 15 (FIG. 5), setting processing of the authentication holding time (FIG. 6), and setting processing of the authenticable range (FIG. 7) will be described later.

On the other hand, in the case of the "engine driven/conduction ON", when the power switch 12 is operated, the vehicle body controller 39 switches the "engine driven/conduction ON" to "engine stop/conduction OFF". That is, when the power switch 12 is operated during driving of the engine 15, the vehicle body controller 39 stops the engine 15. However, it is assumed that the vehicle body controller 39 does not stop the engine 15 even if the portable key device 41 goes out of the authenticable range exceeding the predetermined authentication holding time during driving of the engine 15. The reason for that is, even if the operator temporarily leaves the cab 8 for a crane operation or the like, for example, to omit a labor of starting the engine 15 when the operator returns to the cab 8 and starts the operation.

The hydraulic excavator 1 according to the embodiment has the constitution as described above, and subsequently, its operation will be described.

The small-sized hydraulic excavator 1 having a machine weight of approximately 0.8 to 8 tons is conveyed to the work site in a state loaded on a loading platform of a truck. When the hydraulic excavator 1 is conveyed to the work site, the operator of the hydraulic excavator 1 gets on the cab 8 of the upper revolving structure 4 by holding the portable key device 41, for example. The operator in the cab 8 is seated on the operator's seat 9, and when the operator presses the power switch 12 in a state where the gate lock lever 13 is at the lock position, an ON signal is output. By this output of the ON signal, the vehicle body controller 39 turns ON the ACC relay 29 and also turns ON the C relay 25. When this C relay 25 is turned ON, the starter relay 23 is turned ON. As a result, conduction to the first electrical component 27 and the starter motor 16 is started. As a result, the starter motor 16 is rotated, and the engine 15 is started. After the start of the engine 15, the vehicle body controller 39 turns OFF the C relay 25.

When the engine 15 is started, the hydraulic pump 17 is driven by the engine 15. When the operator operates the gate lock lever 13 from the lock position to the unlock position, driving of the hydraulic actuators (the swing cylinder, the boom cylinder 5E, the arm cylinder 5F, the bucket cylinder 5G, the revolving hydraulic motor, the traveling hydraulic motor) is allowed.

For example, the operator can advance or retreat the lower traveling structure 2 by operating the operating lever/pedal 11 for traveling. The operator can perform the excavating work of earth and sand or the like by moving upward/downward the working mechanism 5 by operating the operating lever 10 for work. In this case, since the small-sized hydraulic excavator 1 has a small turning radius by the upper revolving structure 4, a side-gutter digging work or the like can be performed while the upper revolving structure 4 is turned/driven even in a small work site such as in a street, for example. That is, the small-sized hydraulic excavator 1 can perform the demolishing work of an inside of a building, the side-gutter digging work or the excavating work of earth and sand in a small street or the like by using the working mechanism 5.

When the work is finished, and the operator presses the power switch 12, the ACC relay 29 is turned OFF by the vehicle body controller 39. As a result, conduction to the first electrical component 27 is shut off, and the engine 15 is stopped. On the other hand, in a state where the engine 15 of the hydraulic excavator 1 is stopped, when the operator is seated on the operator's seat 9, sets the gate lock lever 13 to the unlock position and presses the power switch 12, only the ACC relay 29 is turned ON by the vehicle body controller 39 (C relay 25 is kept OFF). As a result, without driving the engine 15, the first electrical component 27 can be conducted. In this state, when the operator presses the power switch 12, for example, the ACC relay 29 is turned OFF by the vehicle body controller 39, and conduction to the first electrical component 27 is shut off.

Figure 5:
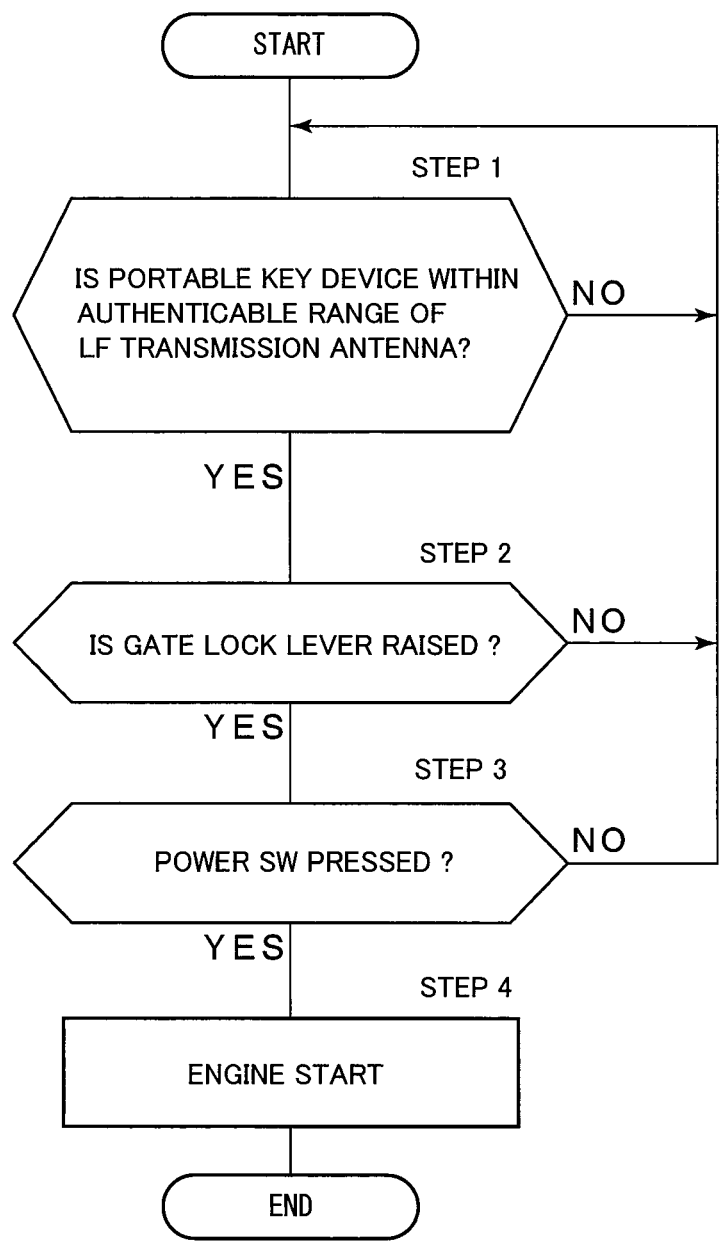
FIG. 5 is a flowchart showing start processing of an engine by a vehicle body controller in FIG. 3.
Figure 6:
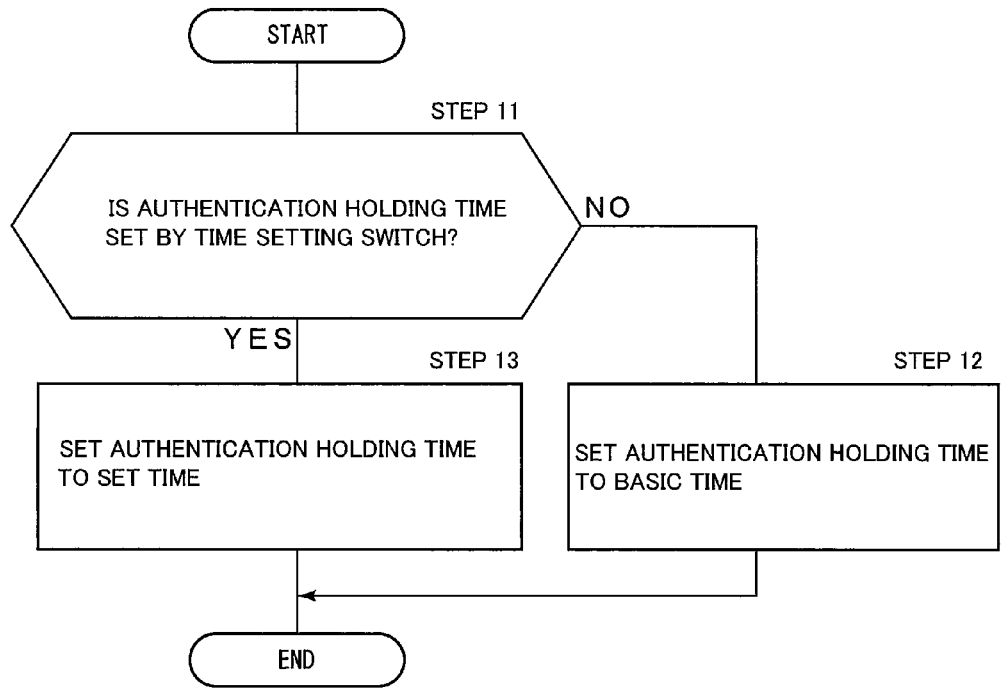
FIG. 6 is a flowchart showing setting processing of authentication holding time.
Figure 7:
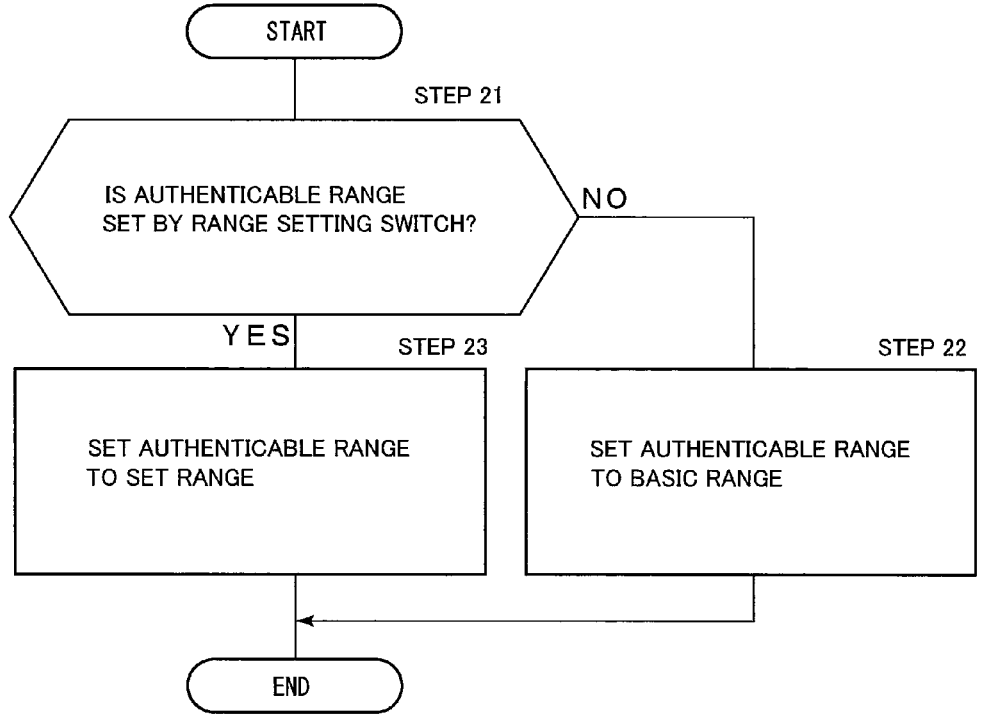
FIG. 7 is a flowchart showing setting processing of an authenticable range.

Next, the processing executed by the vehicle body controller 39 will be described by using flowcharts in FIGS. 5 to 7. It should be noted that FIG. 5 is processing of starting the engine 15, FIG. 6 is processing of setting the authentication holding time, and FIG. 7 is processing of setting the authenticable range.

First, the processing in FIG. 5 will be described. When the ACC relay 29 is turned OFF, that is, when the state of "engine stop/conduction OFF" is brought about, a processing operation in FIG. 5 is started. At Step 1, it is determined whether or not the portable key device 41 is within the authenticable range of the LF transmission antenna 43. This determination can be made by the authentication result output at all times at the predetermined control cycle from the authentication controller 45 to the vehicle body controller 39.

That is, in the case where the portable key device 41 is within the authenticable range of the LF transmission antenna 43, the ID code for authentication is transmitted from the portable key device 41 on the basis of the request signal transmitted from the LF transmission antenna 43. When the authentication controller 45 receives the ID code replied from the portable key device 41 through the RF reception antenna 44, the authentication controller 45 determines whether or not this received ID code is a valid ID code.

At this time, in the case where the ID code is valid, the authentication result indicating that the authenticated portable key device 41 is present within the authenticable range, that is, the fact of the valid authentication is output to the vehicle body controller 39. The fact of this valid authentication is held for the predetermined authentication holding time. Therefore, even if the portable key device 41 is out of the authenticable range or the portable key device 41 enters within the authenticable range once and then, goes out of the authenticable range, the state of the valid authentication is held for the authentication holding time.

The authentication holding time is set by the processing in FIG. 6 which will be described later. The authenticable range, that is, the range in which the request signal is transmitted is set by the processing in FIG. 7 which will be described later. On the other hand, in the case where a valid ID code has not been received (in the case where the authentication holding time has elapsed without receiving the valid ID code), the authentication controller 45 outputs the authentication result indicating that the portable key device 41 is not within the authenticable range, that is, the fact of being unauthenticated to the vehicle body controller 39.

In the case where it is determined at Step 1 to be "YES", that is, that the portable key device 41 is within the authenticable range of the LF transmission antenna 43, the routine proceeds to Step 2. On the other hand, in the case where it is determined at Step 1 to be "NO", that is, that the portable key device 41 is not within the authenticable range of the LF transmission antenna 43, the routine returns to before Step 1 and the processing at Step 1 is repeated.

At Step 2, it is determined whether the gate lock lever 13 is at the raised position (lock position) or not. This determination can be made on the basis of the signal from the gate lock switch 13A. In the case where it is determined at Step 2 to be "YES", that is, that the gate lock lever 13 is at the raised position (lock position), the routine proceeds to Step 3. In this case, start of the engine 15 by the power switch 12 is allowed. On the other hand, in the case where it is determined at Step 2 to be "NO", that is, that the gate lock lever 13 is not at the raised position (lock position), the routine returns to before Step 1, and the processing at Step 1 is repeated.

At Step 3, it is determined whether the power switch 12 has been operated (pressed) or not. This determination can be made on the basis of the ON signal of the power switch 12. In the case where it is determined at Step 3 to be "NO", that is, that the power switch 12 has not been operated, the routine returns to before Step 1, and the processing at Step 1 and after is repeated.

On the other hand, in the case where it is determined at Step 3 to be "YES", that is, that the power switch 12 has been operated (ON signal has been output), the routine proceeds to Step 4, and the engine 15 is started. That is, the vehicle body controller 39 transmits an engine start signal to the ECU 34 and turns ON both of the ACC relay 29 and the C relay 25. As a result, conduction to the first electrical component 27 and the starter motor 16 is started, and the starter motor 16 is rotated. The vehicle body controller 39 turns OFF the C relay 25 after the predetermined time has elapsed. As a result, the starter motor 16 is stopped, and the control processing in FIG. 5 is finished. In this case, in the case where the engine 15 has been started, the state "engine driven/conduction ON" is brought about.

Next, the processing in FIG. 6 will be described. The processing in FIG. 6 is processing executed prior to the processing at Step 1 in FIG. 5. When a processing operation in FIG. 6 is started, it is determined at Step 11 whether or not the authentication holding time is set by the time setting switch 47. In the case where it is determined at Step 11 to be "NO", that is, that the authentication holding time is not set by the time setting switch 47, the routine proceeds to Step 12, the authentication holding time is made the basic time, and the processing in FIG. 6 is finished. On the other hand, in the case where it is determined at Step 11 to be "YES", that is, that the authentication holding time is set by the time setting switch 47, the routine proceeds to Step 13, and the authentication holding time is changed to the set time. That is, the vehicle body controller 39 outputs an instruction that the authentication holding time for holding the authentication is changed to the set value to the authentication controller 45. As a result, in the authentication controller 45, the authentication holding time, that is, the authentication holding time during which the fact of the valid authentication is continuously output to the vehicle body controller 39 even if the valid ID code is not received from the portable key device 41 is changed to the set time. FIG. 8 shows an example of the setting of the authentication holding time.

Next, the processing in FIG. 7 will be described. The processing in FIG. 7 is processing executed prior to the processing at Step 1 in FIG. 5. When a processing operation in FIG. 7 is started, it is determined at Step 21 whether or not the authenticable range is set by the range setting switch 48. In the case where it is determined at Step 21 to be "NO", that is, that the authenticable range is not set by the range setting switch 48, the routine proceeds to Step 22, the authenticable range is made the basic range, and the processing in FIG. 7 is finished. On the other hand, in the case where it is determined at Step 21 to be "YES", that is, that the authenticable range is set by the range setting switch 48, the routine proceeds to Step 23, and the authenticable range is changed to the set range. That is, the vehicle body controller 39 outputs an instruction that the authenticable range is changed to the set value to the authentication controller 45. As a result, intensity of the electric waves of the LF transmission antenna 43 is changed to the set range. FIG. 9 shows an example of the setting of the authenticable range.

Thus, according to the embodiment, the start operation of the engine 15 can be simplified.

(1) That is, according to the embodiment, when the gate lock lever 13 constituting the lock device is at the lock position and the portable key device 41 is within the authenticable range, the operator can start the engine 15 only by operating the power switch 12. Thus, the operator no longer has to insert the key into the key cylinder and to rotate it to a position of "START" in order to start the engine 15 is to be started, and a labor of the operator can be omitted. As a result, the start operation of the engine 15 is simplified, and cumbersomeness is not given to the operator when the engine 15 is to be started.

(2) According to the second embodiment, after the ID code (authentication signal) replied from the portable key device 41 is received, the authentication state is held for the predetermined authentication holding time. Thus, once the portable key device 41 is brought into the authenticable range, the engine 15 can be started even if the portable key device 41 is not present for the predetermined authentication holding time. As a result, the portable key device 41 does not have to be carried at all times, and loss or misplacement of the portable key device 41 can be suppressed. Moreover, the authentication holding time can be variably set by the time setting switch 47 which is the time setting unit. Thus, the manager (operator, foreman at the work site, owner and the like) of the hydraulic excavator 1 can manage the operation of the engine 15 in accordance with the use environment of the hydraulic excavator 1 or the like by adjusting the authentication holding time.

(3) According to the embodiment, the authenticable range can be variably set by the range setting switch 48 which is the range setting unit. Thus, when the authenticable range is set to a small range or a range in the cab 8, for example, only the manager holding the portable key device 41 can start the engine 15 in the cab 8. In other words, start of the engine 15 by those other than the manager holding the portable key device 41 or a person not familiar with the operation of the hydraulic excavator 1, for example, can be suppressed. On the other hand, when the authenticable range is set wide, if the manager (site foreman) of the work site places the portable key device 41 under his control at a specific place in the authenticable range (office, for example), one or a plurality of operators can start the engine 15 even without holding the portable key device 41. Thus, the manager of the hydraulic excavator 1 can manage the operation of the engine 15 according to the use environment of the hydraulic excavator 1 and the like by adjusting the authenticable range.

It should be noted that in the aforementioned embodiment, the case where the authenticated state is held on the authentication controller 45 side of the wireless authentication device 42 for the predetermined authentication holding time is described as an example. However, the present invention is not limited to that, and it may be so constituted that the wireless authentication device is constituted to output whether it is valid authentication or unauthentication to the vehicle body controller at a predetermined control cycle which is not variable, and the authenticated state is held for the predetermined authentication holding time on the vehicle body controller side even if the wireless authentication device is unauthenticated.

In the aforementioned embodiment, the case where the position of the gate lock lever 13 is detected by the gate lock switch 13A, and the vehicle body controller 39 switches the pilot pressure switching valve 31 by turning ON/OFF the pilot cut relay 33 on the basis of this detection result is described as an example. However, the present invention is not limited to that, and it may be so constituted that the pilot pressure switching valve (pilot cut valve) is switched directly by the gate lock lever, for example. That is, various lock mechanisms can be employed for a mechanism for prohibiting or allowing the driving of the hydraulic actuator in accordance with the operation of the gate lock lever as long as it can switch between the lock position where the driving of the hydraulic actuator is prohibited and the unlock position where the driving of the hydraulic actuator is allowed.

In the aforementioned embodiment, the case where the hydraulic actuator which prohibits driving when the gate lock lever 13 is at the lock position (raised position) is used as a hydraulic actuator relating to all of the works and traveling is described as an example. However, the present invention is not limited to that and a hydraulic excavator which prohibits the driving depending on specification of the hydraulic excavator (construction machine) and the like can be selected, for example.

In the aforementioned embodiment, the case where an electric component whose conduction and non-conduction with the battery 21 is switched in accordance with ON/OFF of the ACC relay 29 is the first electrical component 27, an electrical component whose conduction and non-conduction is switched in accordance with ON/OFF of the C relay 25 is the starter motor 16 of the engine 15, and an electrical component connected to the battery 21 at all times regardless of ON/OFF of the ACC relay 29 is the second electrical component 30 is described as an example.

However, the present invention is not limited to that, and an electrical component other than the starter motor 16 may be used as the first electrical component whose conduction and non-conduction with the battery is switched in accordance with ON/OFF of the ACC relay. Moreover, various devices corresponding to the first electrical component 27 and various devices corresponding to the second electrical component 30 in the embodiment are one exemplification and can be changed as appropriate in accordance with specification of the hydraulic excavator, an optional electrical component and the like. That is, whether an electrical component is used as the first electrical component or the second electrical component can be selected in accordance with the electrical component mounted on the hydraulic excavator.

In the aforementioned embodiment, the engine-type hydraulic excavator 1 including the engine 15 is described as an example of a driving source of the hydraulic pump 17. However, the present invention is not limited to that, and a hybrid-type hydraulic excavator (hybrid-type construction machine) including an engine and an assist generator motor (a motor generator, a power generator, and an electric motor) may be used, for example. In this case, the assist motor generator may be used as the starter motor of the engine. Moreover, the driving source (motor) may be an electric motor.

In the aforementioned embodiment, the case mounted on the small-sized hydraulic excavator 1 is described as an example. However, the construction machine according to the present invention is not limited to that and may be applied to a hydraulic excavator of a medium-size or more, for example. Moreover, in addition to a hydraulic excavator including a wheel-type lower traveling structure, the present invention can be widely applied to various construction machines such as a wheel loader, a forklift, a hydraulic crane and the like.

DESCRIPTION OF REFERENCE NUMERALS

1: Hydraulic excavator (Construction machine)
2: Lower traveling structure (Vehicle body)
4: Upper revolving structure (Vehicle body)
5E: Boom cylinder (Hydraulic actuator)
5F: Arm cylinder (Hydraulic actuator)
5G: Bucket cylinder (Hydraulic actuator)
9: Operator's seat
12: Power switch
13: Gate lock lever (Lock device)
15: Engine
17: Hydraulic pump
39: Vehicle body controller
41: Portable key device
42: Wireless authentication device
47: Time setting switch (Time setting unit)
48: Range setting switch (Range setting unit)

The invention claimed is:

1. A hydraulic excavator comprising:
a vehicle body having an operator's seat;
an engine provided on said vehicle body and serving as a power source;
a hydraulic pump driven by said engine and supplying a pressurized oil;
a hydraulic actuator driven by the pressurized oil supplied from said hydraulic pump;
a gate lock lever provided at a position corresponding to an entrance way of said operator's seat and switched between a raised position where said entrance way is opened and driving of said hydraulic actuator is prohibited and a lowered position where said entrance way is closed and the driving of said hydraulic actuator is allowed;
a gate lock switch provided on said gate lock lever and detecting a position of said gate lock lever;
a power switch operated at the time of starting said engine;
a wireless authentication device constituted to transmit an authentication request signal within an authenticable range and, when an authentication signal replied from a portable key device is received on the basis of the transmitted authentication request signal, to perform authentication on whether the authentication signal is valid or not;
a vehicle body controller allowing or prohibiting start of said engine on the basis of an operation of said power switch and authentication by said wireless authentication device;
a time setting switch connected to said vehicle body controller, and variably setting authentication holding time by said wireless authentication device;
a range setting switch connected to said vehicle body controller, and variably setting an authenticable range where said wireless authentication device is capable of performing authentication of said portable key device depending on a use environment; and
a monitor device on which a setting screen of said authentication holding time is displayed when said authentication holding time is to be increased/decreased by using said time setting switch are provided; wherein
said vehicle body controller has a unit for allowing start of said engine by said power switch when a detection signal of said raised position is input from said gate lock switch and a signal of valid authentication indicating that said authentication signal of said portable key device is valid is input from said wireless authentication device;
said wireless authentication device is constituted to have an authentication controller for holding a state of said valid authentication for said authentication holding time set by said time setting switch when the valid authentication signal is received from said portable key device; and said time setting switch is made to set said authentication holding time as a predetermined basic time and variably set a rental allowable time or a lease allowable time longer than the basis time.

* * * * *